United States Patent
Cormican

(10) Patent No.: US 11,928,162 B2
(45) Date of Patent: Mar. 12, 2024

(54) IMPORTING MEDIA LIBRARIES USING GRAPHICAL INTERFACE ANALYSIS

(71) Applicant: GOOGLE LLC, Mountain View, CA (US)

(72) Inventor: Neil Cormican, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 386 days.

(21) Appl. No.: 17/258,410

(22) PCT Filed: May 22, 2018

(86) PCT No.: PCT/US2018/033966
§ 371 (c)(1),
(2) Date: Jan. 6, 2021

(87) PCT Pub. No.: WO2019/226157
PCT Pub. Date: Nov. 28, 2019

(65) Prior Publication Data
US 2021/0294836 A1 Sep. 23, 2021

(51) Int. Cl.
*G06F 16/907* (2019.01)
*G06F 16/532* (2019.01)
*G06F 16/908* (2019.01)

(52) U.S. Cl.
CPC .......... *G06F 16/907* (2019.01); *G06F 16/532* (2019.01); *G06F 16/908* (2019.01)

(58) Field of Classification Search
CPC ..... G06F 16/907; G06F 16/532; G06F 16/908
See application file for complete search history.

(56) References Cited

U.S. PATENT DOCUMENTS

| 8,886,683 | B2 * | 11/2014 | Karibe | H04N 7/17336 710/1 |
| 2005/0213790 | A1 | 9/2005 | Rhoads et al. | |
| 2008/0247600 | A1 * | 10/2008 | Date | G11B 27/329 707/E17.02 |
| 2009/0172038 | A1 | 7/2009 | Mintchev | |
| 2011/0289054 | A1 | 11/2011 | Johnson | |
| 2014/0082646 | A1 | 3/2014 | Sandland | |

(Continued)

FOREIGN PATENT DOCUMENTS

| CN | 1954317 A | 4/2007 |
| CN | 106165436 A | 10/2016 |

(Continued)

OTHER PUBLICATIONS

International Preliminary Report for for Interntional Application No. PCT/US2018/033966 dated Nov. 24, 2020.

(Continued)

*Primary Examiner* — Baoquoc N To
(74) *Attorney, Agent, or Firm* — Lowenstein Sandler LLP

(57) ABSTRACT

The disclosure provides technology for importing a set of media items from a content source by optically analyzing a graphical interface of the content source. An example method includes initiating, by a processing device, an import of a set of media items from a content source; capturing image content of a graphical interface of the content source; extracting data from the image content of the graphical interface; identifying a media item of the content source based on the data from the image content; and storing a reference to the media item.

20 Claims, 5 Drawing Sheets

(56) References Cited

U.S. PATENT DOCUMENTS

| | | | |
|---|---|---|---|
| 2014/0181853 A1 | 6/2014 | Dureau et al. | |
| 2014/0188869 A1 | 7/2014 | Beckmann et al. | |
| 2017/0149868 A1* | 5/2017 | Hahm | H04L 51/52 |
| 2017/0221121 A1 | 8/2017 | Davis et al. | |
| 2017/0264941 A1 | 9/2017 | Milne et al. | |

FOREIGN PATENT DOCUMENTS

| | | |
|---|---|---|
| JP | 2005 522785 A | 7/2005 |
| JP | 2006 523045 A | 10/2006 |

OTHER PUBLICATIONS

Australian Patent Application No. 2018424260 Notice of Allowance dated Oct. 14, 2021, 3 pages.
Australian Patent Application No. 2018424260 Office Action dated Jun. 9, 2021, 4 pages.
Australian Patent Application No. 2018424260 Office Action dated Mar. 15, 2021, 4 pages.
Canadian Patent Application No. 3,096,364 Office Action dated Mar. 17, 2022, 4 pages.
Indian Patent Application No. 202047042700 Office Action dated Sep. 20, 2021, 7 pages.
Japanese Patent Application No. 2020-5550199 Notice of Allowance dated Oct. 30, 2019, 3 pages.
Japanese Patent Application No. 2020-5550199 Office Action dated Dec. 24, 202, 11 pages.
Korean Patent Application No. 10-2020-7028823 Office Action dated Nov. 18, 2021, 15 pages.
European Patent Application No. 18779074.6 Office Action dated Apr. 11, 2022, 7 pages.
International Search Report and Written Opinion for Interntional Application No. PCT/US2018/033966 dated Nov. 7, 2018, 12 pages.
Chinese Patent Application No. 201880092004.3 Office Action dated Aug. 25, 2022, 23 pages.

* cited by examiner

IMPORTING MEDIA LIBRARIES USING GRAPHICAL INTERFACE ANALYSIS

TECHNICAL FIELD

This disclosure relates to the field of importing media items sets between content sources and, in particular, to importing a set of media items by analyzing a graphical interface of a content source.

BACKGROUND

Modern computing devices may access media content from multiple different content providers. Each of the content providers may supply media content to a computing device and enable the computing device to present the media content to one or more users. The content providers may include cable companies that broadcast media content and enable the recipient to store the media content locally using a digital video recorder (DVR). Other content providers may provide media content that can be requested on-demand and subsequently downloaded or streamed to a computing device. A user may modify a computing device to select particular media content and may store these selections in a library associated with the user. The user may then navigate the library to select or consume media content.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In a first aspect of the present disclosure there is described a method. The method comprises, initiating, by a processing device, an import of a set of media items from a content source, capturing image content of a graphical interface of the content source, extracting data from the image content of the graphical interface, identifying a media item of the content source based on the data from the image content, and storing a reference to the media item.

The content source may comprise a personal content library, and wherein storing the reference to the media item may comprise updating a personal content library of a second content source.

One or both of the personal content library of the content source and personal content library of the second content source may correspond to at least one of a digital video recorder (DVR), a content streaming application, or a content store.

Extracting data from the image content of the graphical interface may comprise performing optical recognition on the image content to detect data relating to one or more media items of the set of media items from the content source.

The data relating to the one or more media items may comprise any of a text and a graphic.

Capturing the image content may comprise initiating a camera operation of a first computing device to capture the image content of the graphical interface provided by a second computing device. The first device may be a mobile phone and the second device a television.

Capturing the image content may comprise initiating a screen capture operation of a computing device to capture the image content of the graphical interface, wherein the graphical interface may be provided by an application of the content source executing on the computing device that captures the image content.

Capturing the image content of the graphical interface may comprise capturing a video of the graphical interface during a scrolling operation, wherein the scrolling operation exposes details of a plurality of media items and may comprise at least one of a horizontal scrolling or a vertical scrolling.

Optionally, the method of the first aspect may further comprise, analyzing a plurality of images of the graphical interface, wherein the plurality of images comprise multiple video frames or multiple still images, and stitching image content of one or more of the plurality of images to create stitched image content, the stitched image content comprising details of a media item exposed by a movement of the graphical interface.

Identifying the media item of the content source may comprise, performing a search of a library service using an item of data from the image content, comparing results of the search with another piece of data from the image content, and selecting a media item from the results that match the data of the image content.

The method of the first aspect may further comprise, determining whether the media item has been consumed based on the image content of the graphical interface.

The media item may comprise at least one of a video, an audio recording, a picture, a book, or an application.

In a second aspect of the present disclosure there is provided a system. The system comprises a memory and a processing device communicably coupled to the memory. The processing device is configured to carry out the method of the first aspect.

In a third aspect of the present disclosure there is provided a non-transitory machine-readable storage medium storing instructions which, when executed, cause a processing device to perform operations according to the method of the first aspect.

Optional features of one aspect of the present disclosure may be combined with other aspects of the present disclosure.

BRIEF DESCRIPTION OF THE DRAWINGS

The disclosure is illustrated by way of example, and not by way of limitation, in the figures of the accompanying drawings.

DETAILED DESCRIPTION

Figure 1:
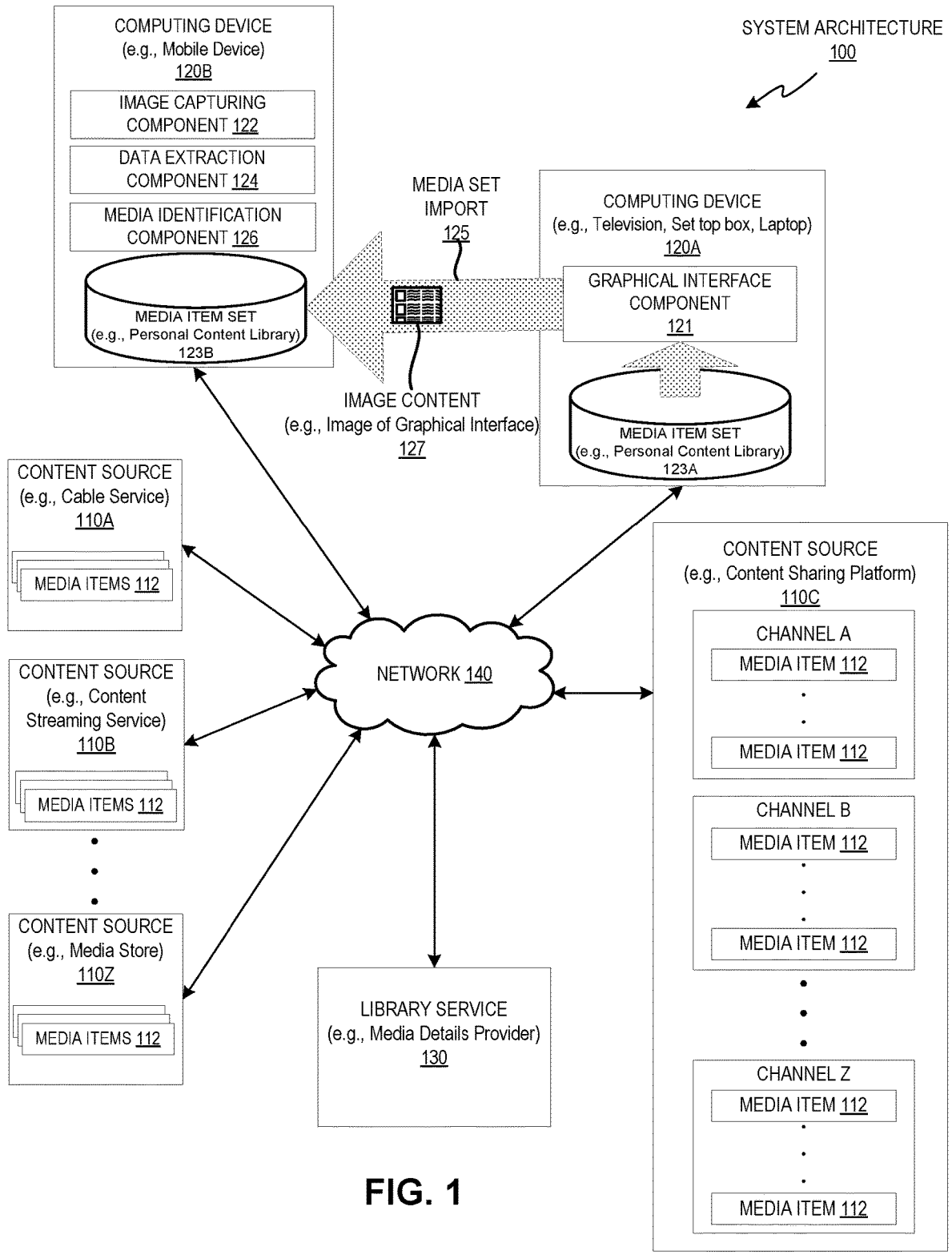
FIG. 1 illustrates an exemplary system architecture in accordance with an implementation of the disclosure.

Modern computing devices may access media content from a variety of different content sources. With each content source, a user may build a library of content (e.g., a set of media selections) with content the user intends to consume, has started consuming, or has previously consumed. Many of the content sources may provide the same or similar media content. When the user switches between content sources, the user's personal library of content may be unavailable from the new content source. The user may have to forgo a personal library (e.g., watch list) or manually rebuild the personal library for the new content source.

Rebuilding the personal library may be a manual and time consuming process because traditional exporting, synchronizations, or replication techniques may be unsupported by the original content source. The user may update the personal library for the new content source by manually repopulating the personal library. This may involve the user accessing graphical interfaces of both the original content source and the new content source. For example, the user may view a graphical interface of the original content source on a first device (e.g., DVR) and for each media item, the user may search the new content source to find the corresponding media item. The user may access the graphical interfaces of the different content sources using different display devices (e.g., television screen for original and mobile device screen for new content) or both may share the same display device, which may make the rebuilding process even more challenging.

Aspects and implementations of the present disclosure are directed to technology for importing a set of media items of a first content source into a second content source. The set of media items may be a data structure that references one or more media items and may be the same or similar to a personal content library, a watch list, a playlist, a reading list, a favorites list, other set, or a combination thereof. The media items in the set may correspond to content that a user will consume, has started consuming, or previously consumed. The technology may enable a computing device to capture an image of a graphical interface of the first content source. The graphical interface may be provided by the same computing device or a different computing device (e.g., DVR) and may display the details of the set of one or more media items in a human readable form. The computing device may analyze the image of the graphical interface and extract data from the image using one or more optical recognition operations. The extracted data may include textual data, graphical data, layout data, other data, or a combination thereof. The extracted data may enable the computing device to identify which media items are in the set of the first content source and to add these media items to a set for the second source. Aspects and implementations of the present disclosure address problems associated with how to migrate data between different data structures. By capturing image content of a graphical interface of the first content source and extracting data from the image content of the graphical interface, the identified data can be automatically added to the second content source. Therefore, data is efficiently copied from one content source to another, even in cases where the first and second content sources do not provide a direct transfer of data between each other.

The complexity of the graphical interface may vary depending on the content source and each content source may provide its own customized graphical interface. The graphical interface may include a variety of features that are intended to organize or arrange the details of the media items. The manner in which the media content is organized may result in only a subset of the media items or a subset of the details for particular media items being displayed by the graphical interface at a particular point in time. For example, the graphical interface may support a variety of movements that alter the content displayed by the graphical interface and may include scrolling (e.g., horizontal and vertical scrolling), drop down expansion (e.g., details displayed when item selected), other features, or a combination thereof. To enable a user to more efficiently capture the content, the user may capture a video of the graphical interface as the user navigates through the content (e.g., scrolls, pages, expands, moves). The computing device may then analyze the video and stitch multiple images (e.g., video frames) together so that a single image captures the content exposed by the motion of the graphical interface.

Systems and methods described herein include technology that enhances the technical field of content sharing platforms by enabling a computing device to more easily identify media content to be consumed by a user. In particular, the technology disclosed may enable a computing device to migrate a personal content library of a user from a first content source (e.g., cable TV) to a second source (e.g., internet TV). Traditional data migration techniques often involve a first source exporting raw data in a format that can be imported by a computing device. Some content sources may avoid export features or include proprietary or burdensome export mechanisms in an effort to discourage users from migrating to another content source (e.g., competitor). The technology disclosed herein can utilize a graphical interface provided by the content source along with image capturing and extraction operations to enable a personal content library of a first content source to be imported into a second content source despite a lack of data exporting features.

FIG. 1 illustrates an example system architecture 100, in accordance with one implementation of the disclosure. The system architecture 100 includes one or more content sources 110A-Z, one or more computing devices 120A-B, a library service 130, and a network 140.

Content sources 110A-Z may be any source of media content and may store and provide media content in the form of one or more media items 112. Media items 112 may include media content in a form that may be provided to a computing device and presented by the computing device to one or more users in a human interpretable form. Media items 112 may include video content, audio content, picture content, textual content, executable content, other content, or a combination there of. The video content may include movies, television shows, sporting events, music videos, news clips, reviews, advertisements, user generated videos, other content, or a combination thereof. The audio content may include audio clips, songs, albums, podcasts, audio books, other content, or a combination thereof. The textual content may include symbols, letters, words, other content, or a combination thereof. The textual content may accompany other content (e.g., graphical content) and may be arranged as a digital book, newspaper, magazine, or other form. The executable content may include one or more applications (e.g., smart phone app, web app) that may be accessed (e.g., loaded) and executed by a computing device to present media content to a user.

In the example shown in FIG. 1, content sources 110A-Z may include one or more content services such as cable services (e.g., 110A), content streaming services (e.g., 110B), content sharing platforms (e.g., 110C), media stores (e.g., 110Z) other content services, or a combination thereof. The cable services may include terrestrial services or satellite services that provide broadcast or on-demand media content and may include Comcast®, Verizon FIOS®, Xfinity®, Dish Network®, other service provider, or a combination thereof. Content streaming services may provide media items by streaming the content over a network connection (e.g., internet connection) and may include Netflix®, Hulu®, Sling®, Prime Video®, HBO Go®, Showtime Anytime®, other streaming services, or a combination thereof. Content sharing platforms may include content hosting services for sharing user generated content and may include video sharing services (YouTube®, Vimeo®) or social networks (Facebook®, Google+®, Myspace®), other services, or a combination thereof. The media stores may include a service that enables you to purchase or rent media items and may include Apple iTunes®, Google Play®, Amazon Prime®, other service, or a combination thereof. Content sources 110A-Z may provide media items 112 to computing device 120A and/or computing device 120B.

Computing device 120A may be any computing device that is capable of receiving one of the media items 112 and providing the media item for presentation to the user. Computing device 120A may include a display device (e.g., integrated display device) or may transmit the content to a separate display device (e.g., connected display device). The display device may include a screen or a projection mechanism and may display content using a television screen, a monitor, a projector screen, a mobile display, a heads-up display, head mounted display, a holographic display, other display technology, or a combination thereof. Some examples of computing device 120A may include a television (e.g., traditional television or smart television), a set top box (e.g., DVR, cable box, Apple TV®, Roku®, FireTV®), a micro console (e.g., Playstation®), a personal computer (e.g., desktop computer, workstation), a mobile device (e.g., mobile phone, tablet, laptop, smart watch, smart glasses, smart contacts), other device, or a combination thereof. Computing device 120A may provide the set of media items for display using a graphical interface component 121.

Graphical interface component 121 may enable computing device 120A to provide a graphical interface to one or more users. In one example, computing device 120A may provide a graphical interface by displaying the graphical interface on a screen of computing device 120A. In another example, providing a graphical interface may involve transmitting a signal to another device without displaying the graphical interface. This may occur because the computing device 120A is absent a screen (e.g., without a display, screen-less, headless) or because the computing device 120A is capable of sending the signal to a different screen (e.g., streaming, casting or flinging to a larger screen). The graphical interface may be any user interface that enables users to interact with media content of one or more of the content sources 110. The graphical interface may be specific to a particular content source 110 or to a particular type of computing device 120A or may be generic to multiple different content sources 110A-Z or computing devices 120A. The graphical interface may enable a user to navigate content of one or more content sources 110A-Z and may display details of media item set 123A.

Media item set 123A may be a data structure that stores a set of media items that are associated with a particular user of a content source. The user may be represented by a profile, account, or identifier that corresponds to a particular individual, family, group, business entity, other entity, or a combination thereof. In one example, media item set 123A may correspond to one or more persons and may be referred to as a personal content library. The set of media items may be an empty set or may include one or more media items selected for the user. Media item set 123A may store details of the media items in the set and the media items may be selected by the user, by the content source, by a third party source, or a combination thereof. The selection may be based on user input, consumed or unconsumed content, previously selected or unselected content, peer data, historical data, profile data, account data, other data, or a combination thereof. In one example, media item set 123A may include details of media items (e.g., title, cover art, consumption status) without storing the content of the media items (e.g., video content). The content may be subsequently received via a broadcast, download, stream, or a combination thereof. In another example, media item set 123A may include the details of the media item and the content (e.g., video content) of the media item.

Computing device 120B may be the same or similar to computing device 120A and may access the graphical interface provided by computing device 120A to import one or more media items of media item set 123A. The import is represented as the arrow labeled media set import 125 in FIG. 1. Media set import 125 may include one or more operations to replicate, duplicate, synchronize, migrate, copy, or add content of media item set 123A to media item set 123B. Media item set 123B may be the same or similar to media item set 123A but may correspond to a different content source. Media item set 1239 may be empty at the time of media set import 125 or may include one or more media items.

Computing device 120B may include one or more executable components to perform media set import 125 and the components may include an image capturing component 122, a data extraction component 124, and a media identification component 126. Image capturing component 122 may enable computing device 120B to capture image content 127 of the graphical interface that is provided by computing device 120B. Capturing of the image content may involve computing device 1209 initiating an image capture operation (e.g., camera picture or video) that records one or more images of the graphical interface. Data extraction component 124 may enable computing device 120B to analyze image content 127 and extract data related to the details of one or more media items of the media item set 123. Media identification component 126 may enable the computing device to analyze the extracted data and identify one or more corresponding media items from a different content source. Media identification component 126 may identify a media item based on media data of a library service 130, the content sources 110A-C (source or destination content source), or a combination thereof.

The functions of computing devices 120A-B may be performed by a single computing device. The single computing device may include the graphical interface component 121 and the image capturing component 122. In this situation, image capturing component 122 may capture image content of the graphical interface using an image capturing operating that involves a screen shot (e.g., picture) a screencast (e.g., video), other operation, or a combination thereof. Further description of components 122, 124, and 126 and their functions are described in more detail below with respect to FIG. 2. In other examples, one or more features discussed in regards to computing devices 120A-B may also or alternatively be performed by a server device, a client device, other device, or a combination thereof which may or may not include a part of a content service, such as content source 1100.

Content source 1100 may be a content sharing platform that may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform may allow a user to consume, upload, search for, approve of ("like"), dislike, and/or comment on shared media items. The content sharing platform may also include a website (e.g., a web application) or application (e.g., smart phone application) and back-end software that may be used to provide a user with access to the media items 112. The content sharing platform may be accessed as a service that is provided to other systems or computing devices through one or more servers via appropriate application programming interfaces, and thus is not limited to use in websites.

Content source 1100 and any of the other content sources A-Z may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on. A "user" may be represented as a single individual. However, other implementations of the disclosure encompass a "user" being an entity controlled by a set of users and/or an automated source. For example, a set of individual users federated as a community in a social network may be considered a user. In another example, an automated consumer may be an automated ingestion pipeline, such as a topic channel, of the content sharing platform.

In situations in which the systems discussed here collect personal information about users, or may make use of personal information, the users may be provided with an opportunity to control whether the content sharing platform collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform.

Network 140 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 240 may be a memory (e.g., random access memory), a cache, a drive (e.g., a hard drive), a flash drive, a database system, or another type of component or device capable of storing data. The data store 240 may also include multiple storage components (e.g., multiple drives or multiple databases) that may also span multiple computing devices (e.g., multiple server computers).

Figure 2:
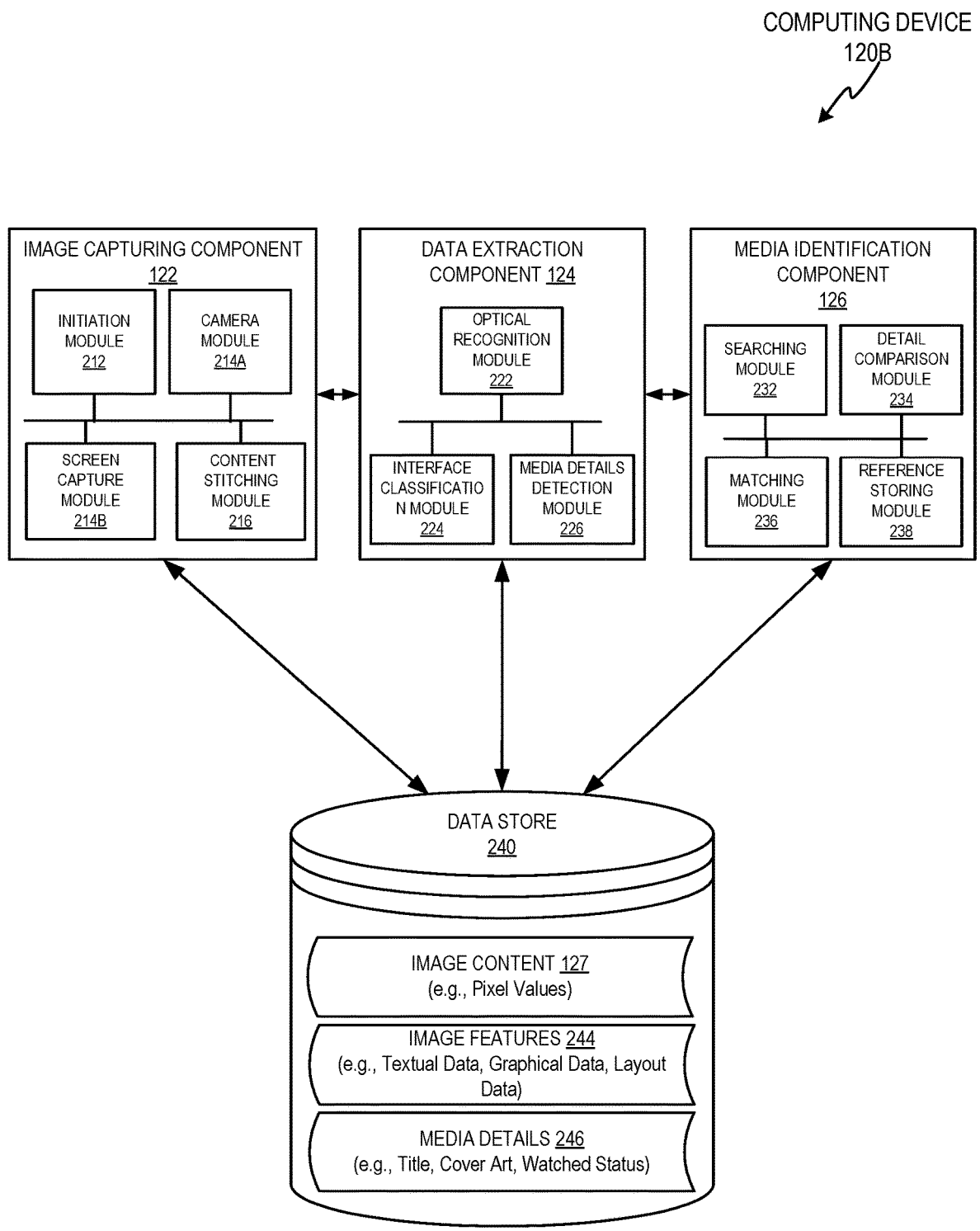
FIG. 2 illustrates an exemplary computing device for importing a set of media items from a content source by optically analyzing a graphical interface of the content source in accordance with an implementation of the disclosure.

FIG. 2 illustrates an example computing device 120B for importing a set of media items by optically analyzing a graphical interface of a content source in accordance with one implementation of the technology. Computing device 120B may initiate the import from a first content source (e.g., original source) in response to receiving user input or in response to automatically detecting (e.g., without user input) that adding media to a set associated with a second content source (e.g., destination or target source) would be advantageous. The components and modules displayed in FIG. 2 may be implemented by one or more applications, operating system features, or a combination thereof. As discussed above, computing device 120B may include an image capturing component 122, a data extraction component 124, a media identification component 126, and a data store 240. More or less components or modules may be included without loss of generality. For example, two or more of the components may be combined into a single component, or features of a component may be divided into two or more components. In one implementation, one or more of the features of the components or modules may reside on different computing devices (e.g., different client device, different server devices, or a combination thereof).

Image capturing component 122 may enable computing device 120B to capture image content 127 of a graphical interface of a content source. This may involve computing device 120B initiating an image capture operation (e.g., camera picture or video) that records one or more images of the graphical interface. In one example, image capturing component 122 may include an initiation module 212, a camera module 214A, a screen capture module 214B, and a content stitching module 216.

Initiation module 212 may initiate an import of a set of media items from a content source by activating an image capture operation. The image capture operation may occur in response to user input activating a graphical control element of computing device 120B. In one example, the graphical control element may be a button control element of an application (e.g., smart phone app) that indicates to the user that the application can import media items from an existing source. The source may be an existing media item set from at least one of a digital video recorder (DVR), a content streaming service, or media store, or other content source. The set may be based on a personal content library of the user that can be accessed using an application associated with the content source. The image capture operation activated by initiation module 212 may use the camera module 214A, the screen capture module 214B, or a combination thereof.

Camera module 214A may enable the computing device 120B to capture the image content of the graphical interface using an optical image capturing device such as a camera. Camera module 214A may use one or more photo sensors of the camera to detect the image content (e.g., an image) and may record the image content to one or more storage devices. The camera may be integrated within the computing device or may be separate from the computing device and communicably coupled with computing device 120B. The camera may be capable of capturing one or more pictures (e.g., still images), a motion picture (e.g., video frames), or a combination thereof. In one example, computing device 120B may be a mobile device (e.g., mobile phone) with an integrated camera and may be executing an application associated with a destination content source (e.g., new content source). The application may initiate the image capturing operation to capture an optical image (e.g., camera picture or video) of a graphical interface provided by another computing device using camera module 214A. The other computing device may be a cable box with DVR functionality that provides the graphical interface to a display device (e.g., television screen, computer screen) for display to a user.

Screen capture module 214B may enable the computing device 120B to capture the image content of the graphical interface using a screen capture operation. The screen capture operation may enable computing device 120B to capture a graphical interface provided by computing device 120B as opposed to capturing a graphical interface provided by another computing device, as discussed above in regards to camera module 214A. The screen capture operation may detect and record the screen output of computing device 120B before, during, or after the screen output is provided to and displayed on a display device associated with computing device 120B. The screen capture operation may capture one or more pictures (e.g., still images, screenshots, screen grabs) or may capture a motion picture (e.g., video frames, screencast). In one example, computing device 120B may execute multiple applications (e.g., smart phone apps) and a first application may be associated with the destination content source (e.g., content sharing platform) and a second application may be associated with the content source that is being imported from. The first application (e.g., YouTube® App) may initiate the image capture operation to capture a screen shot or screencast of the graphical interface of the second application (e.g., app for DVR, Netflix®, HBO Go®, Showtime Anytime®, Prime Video®).

Content stitching module 216 may enable computing device 120A to blend image content from multiple images. Content stitching module 216 may include one or more optical recognition operations to perform object recognition, image registration, alignment, and blending. Object recognition may involve identifying the portion of an image associated with a display device displaying the graphical interface (e.g., TV display). When stitching the image content the image content of the graphical interface may be blended without blending the content of the other portions of the image content (e.g., TV stand, living room wall). Image registration may involve identifying distinguishable image features (e.g., unique features) that are associated with portions of the graphical interface. Image alignment may search the distinguishable image features of the multiple images and find matching features from different images. These matching features may be used to align different images. Image blending may involve blending the image content of a first image with the image content of a second image and may include motion compensation and content de-duplication.

Stitching image content may be advantageous because it may consolidate image content of a graphical interface from multiple images into less images (e.g., a single image) to enhance the speed or quality of subsequent image analysis (e.g., optical recognition). Stitching image content from separate images may provide context or enhance the context of media details displayed in different portions of the graphical interface. For example, the graphical interface may display multiple media items in a graphical structure (e.g., list, table, or grid) and a media item in a particular row may require movement (e.g., horizontal movement) of the graphical interface to expose all the details of a particular media item. A first image may capture the graphical interface when it is scrolled to the left (e.g., to view the first column) and may display a first portion of the details of multiple media items (e.g., title or other identification details). A second image may capture the graphical interface when it is scrolled to the right (e.g., to view the last column) and may display a second portion of the details of the multiple media items (e.g., watched state or other status details). Separately analyzing the first and second images without aligning (e.g., stitching) the content to provide context may result in the identification details of the first image being associated with the incorrect status details of the second image. This may be even more evident if a user horizontally and vertically scrolls so that an entry (e.g., top most entry) in the first image does not align with the corresponding entry (e.g., top most entry) in the second image. By performing image stitching, the image content may provide all the media data in context (e.g., a single image display).

Data extraction component 124 may enable computing device 120B to analyze image content 127 and extract details corresponding to one or more media items of the set of media items displayed by the graphical interface. In one example, data extraction component 124 may include an optical recognition module 222, an interface classification module 224, and a media details detection module 226.

Optical recognition module 222 may enable computing device 120B to analyze image content 127 and extract data for identifying the media items listed in the graphical interface. Optical recognition module 222 may perform one or more optical recognition operations on the image content to recognize image features 244 of the graphical interface. Image features 244 may include textual data, graphic data, layout data, other data, or a combination thereof. The textual data may include symbols, letters, numbers, words, other data, or a combination thereof. The graphical data may include a media graphic such as cover art, album art, thumbnail image, a particular video frame, other graphic, or a combination thereof. The layout data may identify aspects of the graphical interface such as panels, windows, menus, tabs, rows, columns, drop down lists, expansion stubs, buttons, other display features, or a combination thereof.

In one example, a graphical interface may include multi-plane scrolling in which a portion of the graphical interface moves (e.g., scrolls) at a different rate then another portion of the graphical interface. For example, a region below a media item graphic (e.g., cover art) may include scrolling data that displays the title or other details about the media item. The scrolling data may include a text string that is longer than the region of the display and the movement may enable the entire text string to be displayed over a duration of time (e.g., scrolling cycle). Optical recognition module 222 may detect the multi-plane scrolling and analyze a combination of multiple images to recognize the content being scrolled. These features may be stored in a data store (e.g., as image content 127, media features 244, or media details 246) or be embedded into the captured image content or the stitched image content and accessed by another component or module.

Interface classification module 224 may enable computing device 120B to classify the graphical interface and detect the origins of the graphical interface. The graphical interface may originate from a particular content source, a particular computing device, or a combination thereof. In one example, the graphical interface may correspond to a particular content source (e.g., Xfinity®) and may look the same or similar and be independent of the computing device used to access the content source. In another example, the graphical interface may correspond to a particular content source and a particular computing device (e.g., client device, web browser, mobile app). For example, a cable service may be accessed from different computing devices (e.g., set top box, mobile device, personal computer) and each computing device may have a different graphical interface. Interface classification module 224 may access and analyze the image content 127, extracted data, image features, or a combination thereof to determine which of a plurality of predetermined graphical interface templates correspond to the displayed graphical interface.

The graphical interface template may be used to enhance the speed and/or quality of the analysis. The graphical interface template may indicate portions of the displayed graphical interface that correspond to the media details necessary for the import and may enable the analysis to reduce (e.g., ignore, avoid) analysis of other portions of the graphical interface. In one example, classifying the graphical interface may enhance the data extraction by enabling computing device 120B to provide the user with instructions to expose details of the media item. The instructions may indicate to the user how to manipulate (e.g., navigate) the graphical interface and may include instructions such as, scroll to the left, expand item drop down, select tab, launch window, go back, other instruction, or a combination thereof.

Media details detection module 226 may analyze image features 244, image content 127, other data, or a combination there of to detect media details 246 of the one or more media items in a displayed set of media items. Media details detection module 226 may analyze the textual data and image data in view of the layout data to determine which data corresponds to a particular entry (e.g., media item on a first row) and which data corresponds to a different entry (e.g., media item on a second row). Media details detection module 226 may access the output of interface classification module 224 to determine a particular region of a graphical interface that includes data for corresponding to particular media details (e.g., title field, watched field, subscription field).

Media details 246 may include any details displayed by the graphical interface and may be subsequently used to identify particular media items. Media details may include identification data, status data, summary data, review data, other data, or a combination thereof. The identification data may be data used to identify a media item and may include title data (e.g., title of movie, show, game, series, episode), description data (summary, duration), release data (e.g., creation date, upload date, release date), producer data (e.g., author, producer, director), media participant data (e.g., actors, artists), media provider (e.g., studio, content source), other data, or a combination thereof. The status data may include consumption data, subscription data, access data, or a combination thereof. The status data may indicate whether a particular media item was consumed (e.g., watched, read, listened to, downloaded, installed, or accessed). The consumption data may indicate whether consumption was started, in-progress, or finished and may be based on a symbol (e.g., check-mark, hallow circle), label (e.g.; "watched", "unwatched"), text font (strikethrough, color, bold), location (e.g., watched section), graphic modification (e.g., greyed-out cover art), other indicator, or a combination thereof.

Media identification component 126 may enable the computing device to analyze the data discussed above to identify one or more corresponding media items from a new content source. Media identification component 126 may identify a media item based on the data discussed herein and in view of a library service, a content source (original or new content source), or a combination thereof. In one example, media identification component 126 may include a searching module 232, a detail comparison module 234, a matching module 236, and a reference storing module 238.

Searching module 232 may perform one or more searches of media items using one or more items of data discussed above. For example, searching module 232 may access data extracted from the image and may perform a search using the extracted data. The search may be a textual search based on one or more key words (e.g., title, dates, participants), a graphical search based on one or more graphics (e.g., cover art, representative frame, scene), other search, or a combination thereof. The search may return a single media item or a plurality of media items from a library service. The library service may be internal to computing device 120A (e.g., local database) or external to computing device 120B (e.g., separate or remote from computing device 120B). An external library service may be integrated with the content source that the user is switching to or may be a third party library service accessible to computing device 120B. The third party library service may provide details about the media items without providing the content (e.g., video content) of the media items.

Detail comparison module 234 may compare details extracted from the graphical interface with the details returned from one or more searches. The search may return search results with one or more media items and the detail comparison module 234 may compare the details of a particular media items with the details of the one or more media items in the search results. In one example, the comparison may involve comparing the release data or participant data of the results returned for a particular media item title.

Matching module 236 may identify one or more matching media items based on the search results and/or the above comparison. The matching may rank one or more of the search results and may identify one or more of the media items as a best match (e.g., exceeds a predetermined threshold value).

Reference storing module 238 may store a reference to the identified media item. The reference may by identified from a displayed media item set of a first content source (e.g., original content source) and may be stored in a media item set for a second content source (e.g., new content source). The reference may be any data structure that can store data indicating a media item accessible to the second content source and may include an identifier (e.g., video ID), link (e.g., hyperlink), other identification data or reference, or a combination thereof.

Data store 240 may include persistent data storage (e.g., flash storage) or non-persistent data storage (e.g., memory) and may be local to computing device 120B, remote from computing device 120B, or a combination thereof. Local data storage may be internal to computing device 120B and may include embedded storage, removable storage, or other type of storage. Remote data storage may be external to computing device 120B and may be accessible by computing device 120B over a network connection. In one example, the data store 240 of computing device 120B may include a combination of local data storage that comprises embedded data storage and remote data storage that may be cloud based data storage.

Figure 3:
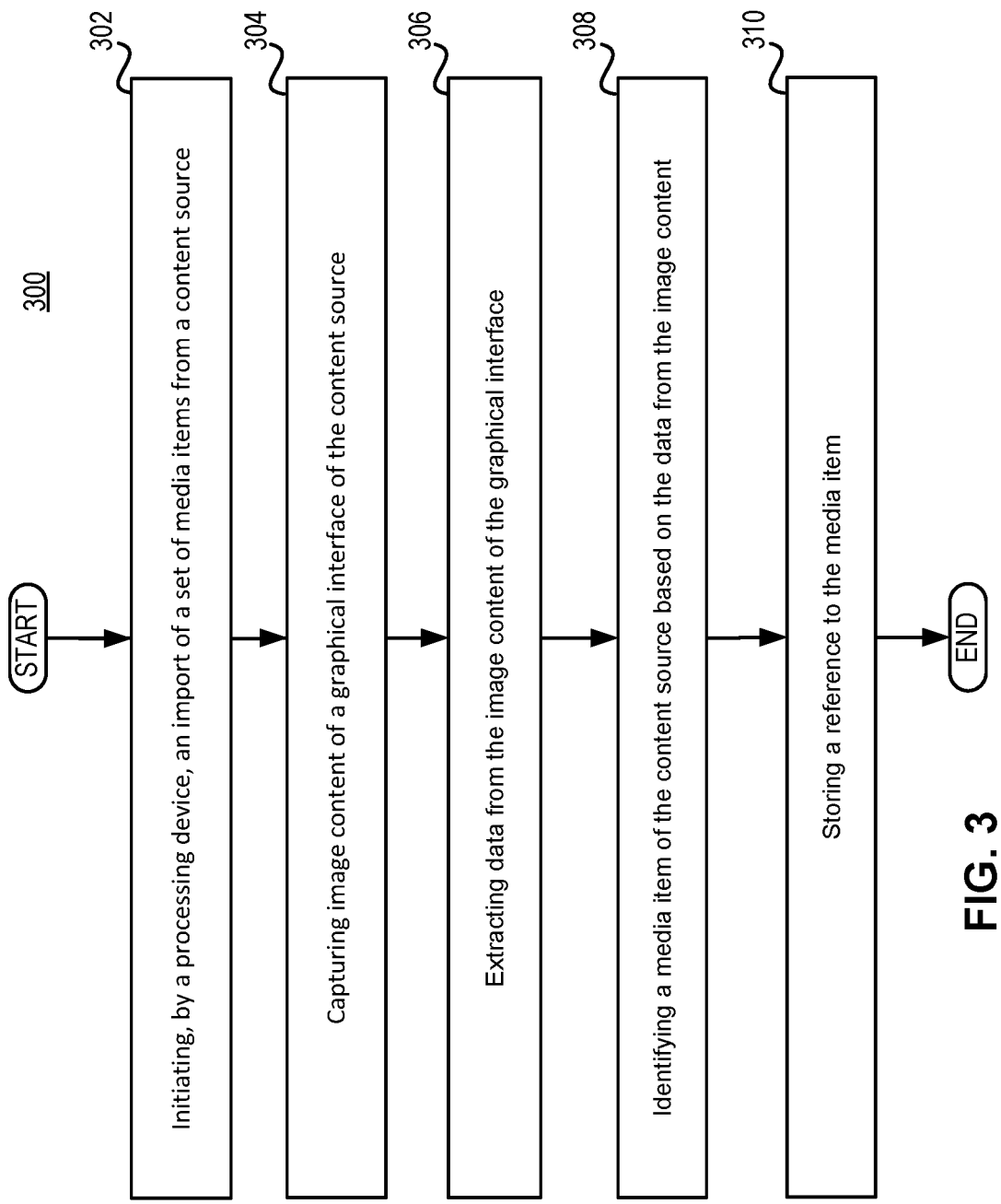
FIG. 3 is a block diagram illustrating a method for importing a set of media items from a content source by optically analyzing a graphical interface of the content source, in accordance with an implementation of the disclosure.

FIG. 3 depicts a flow diagram of one illustrative example of a method 300 for importing a set of media items by optically analyzing a graphical interface of a content source in accordance with one implementation of the technology. Method 300 and each of its individual functions, routines, subroutines, or operations may be performed by one or more processors of a computer device executing the method. In certain implementations, method 300 may be performed by a single computing device. Alternatively, methods 300 may be performed by two or more computing devices, each of the computing devices executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by computing device 120B as shown in FIGS. 1 and 2.

Method 300 may be performed by processing devices of a server device or a client device and may begin at block 302. At block 302, a processing device may initiate an import of a set of media items from a content source. The set may include one or more media items and may correspond to a personal content library of a content source that includes at least one of a digital video recorder (MIR), a content streaming application (e.g., Netflix®, HBO Go®, Showtime Anytime®, Prime Video®), a content store (e.g., iTunes Store®, Google Play®), or a combination thereof.

At block 304, the processing device may capture image content of a graphical interface of the content source. Capturing the image content may involve activating, based on user input, an image capturing operation and receiving and recording the image content of the graphical interface. The image capturing operation may include a camera operation or a screen capture operation. In one example, capturing the image content may involve initiating a camera operation of a first computing device to capture the image content of the graphical interface provided by a second computing device (e.g., optical output of a display device). The first and second computing devices may be different devices such as a mobile phone and a television respectively. In another example, capturing the image content may involve initiating a screen capture operation of a computing device that captures the image content of the graphical interface (e.g., digital output destined for display device). The graphical interface may be provided by an application of the content source executing on the same computing device.

Image capturing operation may capture a plurality of still images (e.g., camera pictures, or screen shots) or a plurality of video images (e.g., camera video or video screen capture). The images may capture motion of the graphical interface, such as motion occurring during one or more scrolling operations (e.g., multi-plane scrolling). The scrolling operation may expose details of a plurality of media items and comprise at least one of a horizontal scrolling, vertical scrolling, other scrolling, or a combination thereof. The graphical interface may comprise dimensions that display a subset of the set of media items and may be absent (e.g., missing, hidden, without) details of at least one or more other media items in the set. In one example, the processing device may analyze the plurality of images and stitch image content of one or more of the plurality of images to create stitched image content. The stitched image content may include details of a media item exposed by a movement of the graphical interface.

At block 306, the processing device may extract data from the image content of the graphical interface. Extracting data from the image content of the graphical interface may comprise performing optical recognition on the image content to detect a text and/or a graphic (e.g., cover art, album art, thumbnail graphic) of one or more media items of the set of the content source. The extracted data may include layout data, textual data, graphic data, or other data of the graphical interface. The processing device may analyze the extracted data to determine whether the media item has been consumed (e.g., fully consumed, or partially consumed, unconsumed).

At block 308, the processing device may identify a media item of the content source based on the data from the image content. Identifying the media item of the content source may involve performing a search of a library service using an item of data (e.g., title text) from the image content. The library service may be separate from the content source and may provide by a content sharing platform or a third party source (e.g., IMDB, Gracenote). The processing device may also compare results of the search with another piece of data (e.g., release date) from the image content and select a media item from the results that best match the data of the image content (e.g., match within a predetermined threshold value).

At block 310, the processing device may store a reference to the media item. Storing the reference to the media item may involve updating a personal content library of a second content source with the reference to the media item. Responsive to completing the operations described herein above with references to block 310, the method may terminate.

Figure 4:
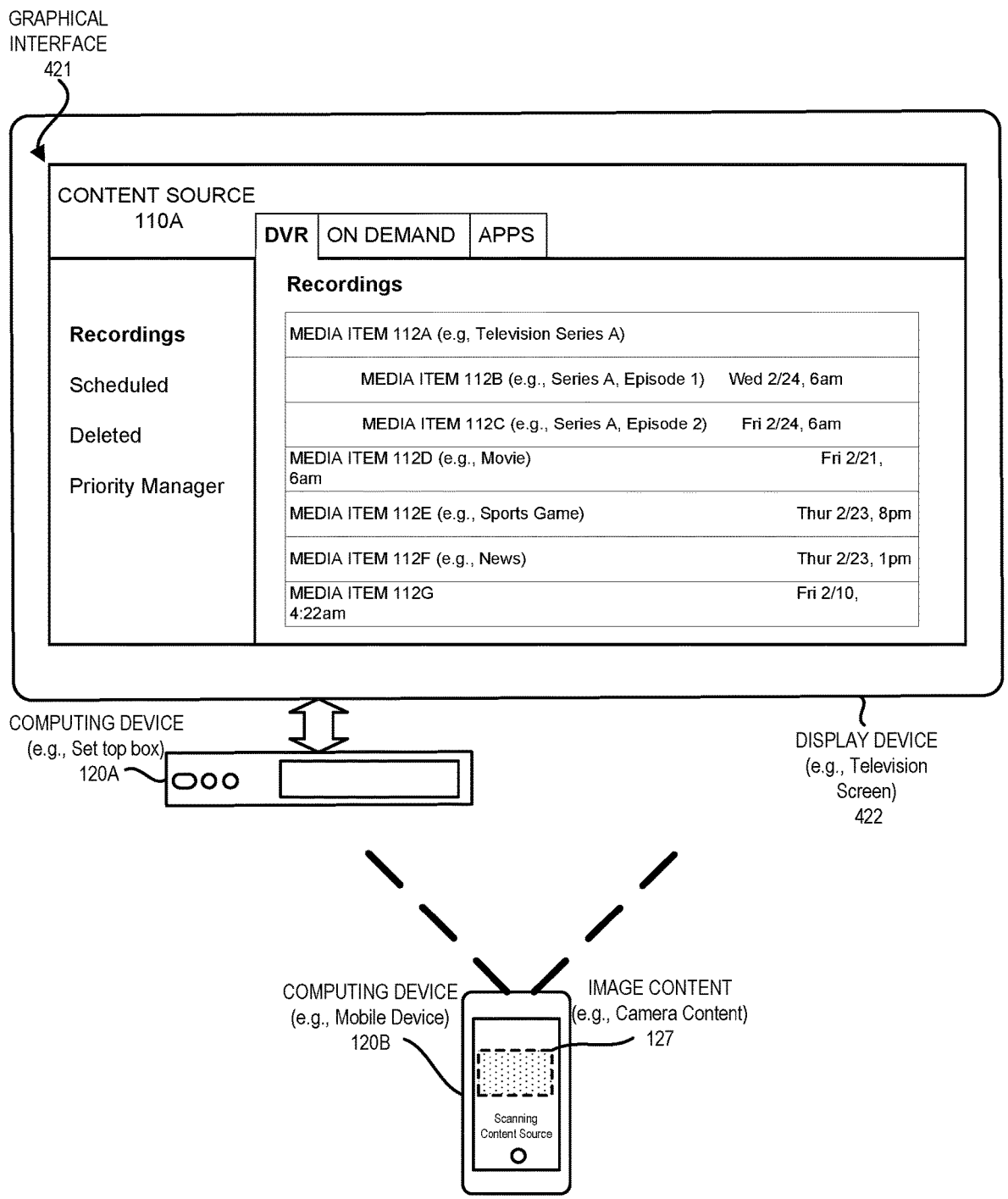
FIG. 4 is an example graphical interface for viewing a set of media items, in accordance with an implementation of the disclosure.

FIG. 4 provides an example graphical interface 421 of a content source 110A and an example computing device 120B for importing a set of media items displayed by graphical interface 421. In the example shown, there are multiple computing devices 120A-B, a display device 422, a graphical interface 421, and image content 127.

Computing device 120A may be a set top box associated with a particular content source 110A (e.g., cable company). Computing device 120A may be communicatively coupled to a display device 422A via a wired connection (e.g., HDMI, VGA, DisplayPort) or wireless connection (e.g., Wifi, Bluetooth). Computing device 120A may provide graphical interface 421 to display device 422 (e.g., television screen), which may display the graphical interface to computing device 120B. Computing device 120B may be a mobile phone with a camera and may capture image content 127 of the graphical interface 421. Computing device 120B may be associated with another content source and may perform the features discussed above in regards to FIGS. 1-3 to import the set of media items 112A-G into the other content source.

Figure 5:
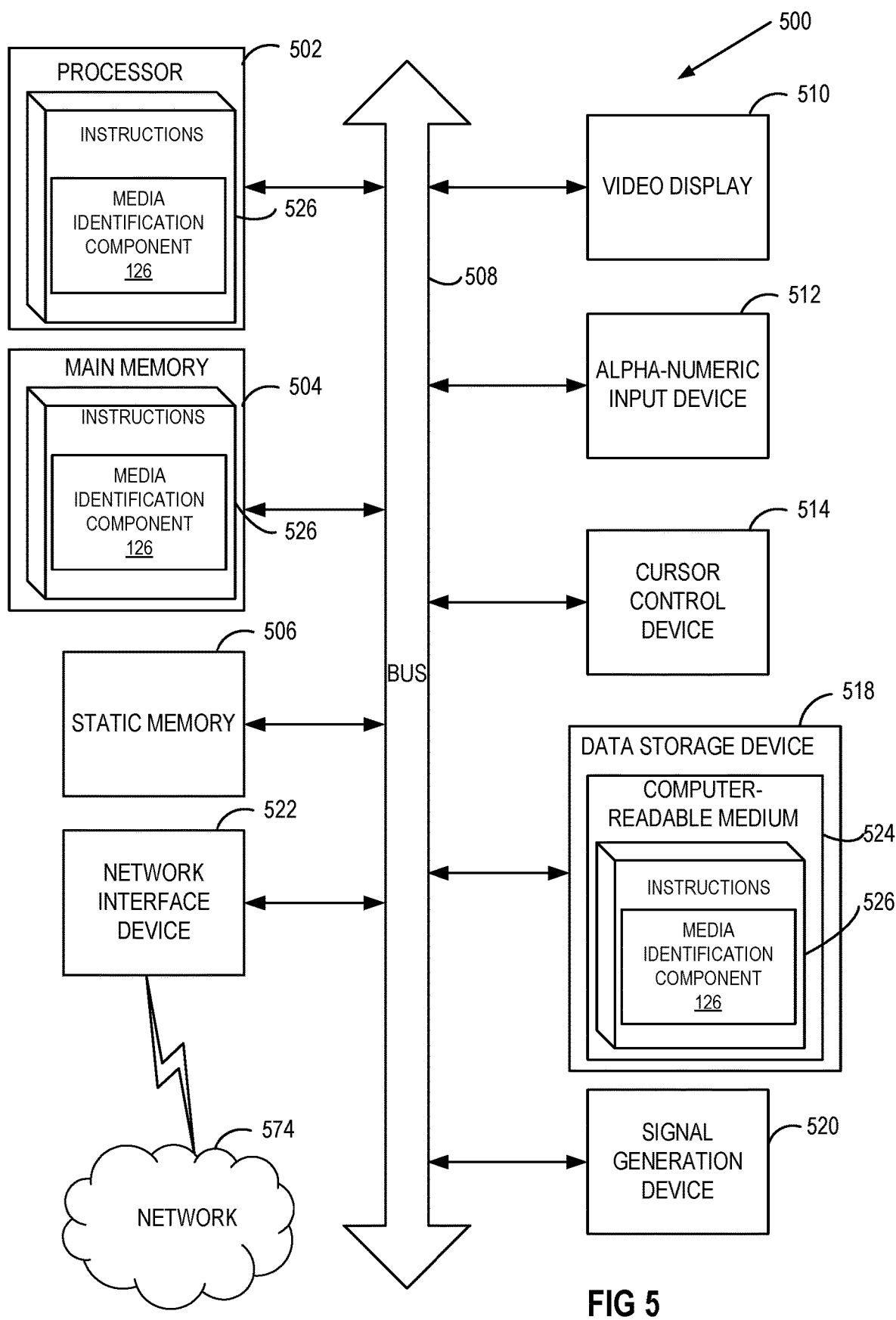
FIG. 5 is a block diagram illustrating an exemplary computer system in accordance with an implementation of the disclosure.

FIG. 5 depicts a block diagram of a computer system operating in accordance with one or more aspects of the present disclosure. In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding media identification component 126 of FIGS. 1 and 2 and for implementing method 300.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "detecting," "determining," "releasing," "destroying," "initiating," "creating," "abandoning," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   initiating, by a processing device, an import of a set of media items from a first content source to a second content source;
   capturing image content of a graphical interface of the first content source;

extracting data from the image content of the graphical interface;
identifying a media item of the first content source based on the data from the image content; and
updating a content library associated with the second content source to include a reference to the media item, wherein media items referenced by the content library are accessible to one or more users of the second content source.

2. The method of claim 1, wherein the content source comprises a personal content library, and wherein storing the reference to the media item comprises updating a personal content library of a second content source.

3. The method of claim 2, wherein one or both of the personal content library of the content source and personal content library of the second content source correspond to at least one of a digital video recorder (DVR), a content streaming application, or a content store.

4. The method of claim 1 wherein extracting data from the image content of the graphical interface comprises performing optical recognition on the image content to detect data relating to one or more media items of the set of media items from the content source.

5. The method of claim 4, wherein the data relating to the one or more media items comprises any of a text and a graphic.

6. The method of claim 1, wherein capturing the image content comprises initiating a camera operation of a first computing device to capture the image content of the graphical interface provided by a second computing device.

7. The method of claim 6, wherein the first computing device is a mobile phone and the second computing device is a television.

8. The method of claim 1, wherein capturing the image content comprises initiating a screen capture operation of a computing device to capture the image content of the graphical interface, wherein the graphical interface is provided by an application of the content source executing on the computing device that captures the image content.

9. The method of claim 1, wherein capturing the image content of the graphical interface comprises capturing a video of the graphical interface during a scrolling operation, wherein the scrolling operation exposes details of a plurality of media items and comprises at least one of a horizontal scrolling or a vertical scrolling.

10. The method of claim 1, further comprising:
analyzing a plurality of images of the graphical interface, wherein the plurality of images comprise multiple video frames or multiple still images; and
stitching image content of one or more of the plurality of images to create stitched image content, the stitched image content comprising details of a media item exposed by a movement of the graphical interface.

11. The method of claim 1, wherein identifying the media item of the content source comprises:
performing a search of a library service using an item of data from the image content;
comparing results of the search with another piece of data from the image content; and
selecting a media item from the results that match the data of the image content.

12. The method of claim 1, further comprising determining whether the media item has been consumed based on the image content of the graphical interface.

13. The method of claim 1, wherein the media item comprises at least one of a video, an audio recording, a picture, a book, or an application.

14. A system comprising:
a memory; and
a processing device communicably coupled to the memory, where the processing device is configured to:
initiate an import of a set of media items from a first content source to a second content source;
capture image content of a graphical interface of the first content source;
extract data from the image content of the graphical interface;
identify a media item of the first content source based on the data from the image content; and
update a content library associated with the second content source to include a reference to the media item, wherein media items referenced by the content library are accessible to one or more users of the second content source.

15. The system of claim 14, wherein the content source comprises a personal content library, and wherein to store the reference to the media item, the processing device is to update a personal content library of a second content source.

16. The system of claim 15, wherein one or both of the personal content library of the content source and personal content library of the second content source correspond to at least one of a digital video recorder (DVR), a content streaming application, or a content store.

17. A non-transitory machine-readable storage medium storing instructions which, when executed, cause a processing device to perform operations comprising:
initiating an import of a set of media items from a first content source to a second content source;
capturing image content of a graphical interface of the first content source;
extracting data from the image content of the graphical interface;
identifying a media item of the first content source based on the data from the image content; and
updating a content library associated with the second content source to include a reference to the media item, wherein media items referenced by the content library are accessible to one or more users of the second content source.

18. The non-transitory machine-readable storage medium of claim 17, wherein the content source comprises a personal content library, and wherein storing the reference to the media item comprises updating a personal content library of a second content source.

19. The non-transitory machine-readable storage medium of claim 18, wherein one or both of the personal content library of the content source and personal content library of the second content source correspond to at least one of a digital video recorder (DVR), a content streaming application, or a content store.

20. The non-transitory machine-readable storage medium of claim 17, wherein extracting data from the image content of the graphical interface comprises performing optical recognition on the image content to detect data relating to one or more media items of the set of media items from the content source.

* * * * *